United States Patent [19]

Lipp et al.

[11] 3,844,910

[45] Oct. 29, 1974

[54] PROCESS FOR THE PRODUCTION OF METAL COATINGS

[75] Inventors: Alfred Lipp, Bad Worishofen; Gunter Kratel, Sankt Mang, both of Germany

[73] Assignee: Elektroschmelzwerk Kempten GmbH, Munich, Germany

[22] Filed: July 19, 1973

[21] Appl. No.: 380,823

[30] Foreign Application Priority Data

July 25, 1972 Germany............................ 2236443

[52] U.S. Cl..................... 204/45 R, 204/16, 204/49
[51] Int. Cl............................................... C23b 5/00
[58] Field of Search......... 204/16, 45 R, 45 A, 45.5, 204/46 R, 46 G, 47, 48, 49, 50 R, 50 Y, 51, 52 R, 52 Y, 53, 54 R, 54 L, 55 R, 55 Y

[56] References Cited

UNITED STATES PATENTS

| | | | |
|---|---|---|---|
| 3,061,525 | 10/1962 | Grazen.............................. | 204/16 X |
| 3,268,308 | 8/1966 | Tomaszewski et al............ | 204/49 X |

*Primary Examiner*—G. L. Kaplan
*Attorney, Agent, or Firm*—Francis M. Crawford

[57] ABSTRACT

The present invention relates to improving the concentration and distribution of finely divided, solid nonmetallic substances in metallic coatings by suspending in the aqueous electrolytic baths from which such coatings are produced regulated amounts of at least one amino-organosilicon compound, such as, for example, gamma-aminopropyl-triethoxy silicane.

6 Claims, No Drawings

PROCESS FOR THE PRODUCTION OF METAL COATINGS

The present invention relates to the improvement in the process for the production of metallic coatings containing embedded therein finely divided solid nonmetallic substances which comprises suspending in the aqueous electrolyte used for the production of said coatings small amounts of amino-organosilicon compounds in addition to the conventional components of such baths. More particularly, it relates to the suspension in such baths of aminoorganosilicon compounds containing at least one amino group bonded through carbon to silicon.

The improvement of the present invention makes it easier to maintain a more uniform suspension of the nonmetallic solid substance in the aqueous electrolyte bath and thereby to regulate the amount of solid nonmetallic substance embedded in the coating, as well as to obtain coatings having more uniform distribution and also higher concentrations of the solid nonmetallic substance in the metallic coatings than has hitherto been possible.

The amino-organosilicon compounds used to accomplish the above improved results are organosilicon compounds which contain at least one amino group bonded through carbon to silicon. Preferably, the amino-organosilicon compounds used in accordance with the present invention contain, in addition to at least one amino group bonded through carbon to silicon, at least one hydrolyzable atom bonded to silicon, a hydrolyzable group bonded to silicon and/or a hydroxyl group bound to silicon. Such amino-organosilicon compounds are, in particular, those having the formula

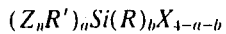

$$(Z_nR')_aSi(R)_bX_{4-a-b}$$

wherein $R$ signifies a monovalent hydrocarbon residue, $R'$ stands for an aliphatic residue having one or more than two carbon atoms, which can be interrupted through ether oxygen atom and which has a valence of $n + 1$, $n$ represents a positive whole number, $X$ is a hydrolyzable atom, a hydrolyzable group or a hydroxyl group, $a$ stands for the numeral 1 or 2, $b$ stands for 0, 1 or 2, the sum of $a + b$ is 1, 2 or 3, and $Z$ represents the group $NH_2$ or a monovalent group which is bound through a carbon-nitrogen bond to $R'$, consists of carbon, nitrogen and hydrogen atoms and contains at least two amino groups.

The most important example for the hydrocarbon residue R is the methyl residue. Examples for the groups $Z_n$ $R'$ may be taken from the specific amino-organosilicon compounds listed below. Examples of hydrolyzable atoms or hydrolyzable groups X include halogens, especially chlorine, hydrogen, alkoxy groups having one – four carbon atoms, such as methyl, ethyl and isopropyl groups, hydrocarbon residues substituted by amino or alkoxy groups, such as shown by the following specific examples of amino-organosilicon compounds, and amino groups that can be substituted by hydrocarbon residues.

Examples of silanes covered by the above formula and which are suitable for use in accordance with the present invention include: gamma-aminopropyltriethoxy silane, N-beta-aminoethyl-gamma-aminopropyltrimethoxy silane, O-beta-aminoethyl-gamma-oxypropylmethyl-bis (beta-aminoethoxy-)silane, O-beta-aminoethyl-gamma-oxypropyl-tris (beta-aminoethyl-)silane, O-beta-aminoethyl-gamma-oxypropyltriethoxy silane, N-beta-aminoethyl-gamma-aminopropyl-triethoxy silane, N-beta-aminoethyl-delta-aminobutyltriethoxy silane, aminomethyltrimethoxy silane, N-beta-aminoethyl-gamma-aminopropyl-tris (beta-methoxyethoxy-) silane and delta-aminobutyltriethoxy silane.

The amino-organosilicon compounds enumerated above are indeed all silanes. However, the amino-organosilicon compounds used in accordance with this invention may also be polymer compounds. Examples of such polymer compounds include amino-organosiloxanes formed by condensation of compounds having the formula set out above in which at least one X is a hydroxyl group, and amino-organosilazanes such as hexa-gamma-aminopropyl disilane.

Because of ready availability, and the fact that it gives especially good results, gamma-aminopropyltriethoxy silane is a preferred amino-organosilicon for use in accordance with the present invention.

It should be noted that mixtures of the various specified amino-organosilicon compounds can be satisfactorily used.

The amino-organosilicon compounds of the present invention can be used in amounts of the order of 0.1 to 3 percent, by weight, and preferably, in amounts of the order of 0.2 to 2 percent, by weight, based on the weight of the nonmetallic, finely divided, solid substance to be incorporated into the metallic coating. In general, the amount of nonmetallic solid substance incorporated into the coating is increased with increases in the amount of amino-organosilicon compound used.

In carrying out the invention the required amount of amino-organosilicon compound can be added directly to the aqueous electrolyte bath. Preferably, however, they are added to the aqueous bath only after they have been adsorbed to the nonmetallic, finely divided, solid material, or reacted therewith, or water adsorbed therewith.

The absorption or reaction of the amino-organosilicon compound with the nonmetallic, finely divided, solid substance, or the water adsorption therewith can be effected in any conventional well known method for such purposes. For example, the nonmetallic finely divided, solid substance can be mixed with the amino-organosilicon compound and if needed 0.1 to 2 percent, by weight, of water at 10 to 150°C in a suitable mixing apparatus, preferably one having a grinding action, such as a ball mill. Advantageously, the treatment of the nonmetallic, finely divided, solid material with the amino-organosilicon compound is effected in a manner so that the solid substance is worked up in a mixture of water or volatile solvent or amino-organosilicon compound is added to a suspension of the solid substance in water or volatile organic solvent and the water or solvent then evaporated.

As the nonmetallic, finely divided, solid substance, the conventionally used silicon carbide is preferably used. However, other suitable materials include such materials as oxides, such as aluminum oxide, zirconium oxide and iron oxide; borides, carbides other than silicon carbide which are inert to water, such as tungsten carbide; silicides, such as molybdenum silicide; sulfides, such as molybdenum sulfide; diamond powder, graphite powder, and the like.

Generally, the grain size of the nonmetallic, finely divided, solid substance should not be greater than 10 microns, and preferably not greater than 5 microns. For most purposes the preferred grain size is within the range of 0.1 – 3 microns, although, in general, no lower limit to the grain size is important.

The metal of the metallic coatings produced in accordance with the present invention and in which the nonmetallic, finely divided, solid substances are embedded can be any of the metals conventionally used in producing coatings by electrolytic means from aqueous electrolytes, and referred to in the technical literature as "dispersion coatings." Examples of such metals include such metals as nickel, cobalt, cobalt-tungsten, and the like.

Apart from the addition of the amino-organosilicon compounds, the compositions of the electrolytic baths are, in general, the same or similar to those conventionally used for the production of metallic coatings. The same applies to the method of producing the coatings.

The bases on which the coatings can likewise be the same as used in conventional metal coating processes. Examples of such bases include the surfaces of tools, dies, punches, gauges and other devices used in manufacturing, as well as more or less finished parts, such as propellers for airplanes, turbine blades, the outer skins of airplanes and projectiles, the inner walls of combustion spaces, including those of circular piston motors, valve seats, piston rings, and the like.

By means of the embedded nonmetallic substances there can be imparted to the surfaces of the metal coatings various properties as desired. For example, their roughness or their sliding capacity and/or their resistance to wear or stability to corrosion can be changed in a known manner per se.

The following specific examples illustrate the method of carrying out the invention and some of the results which can be obtained thereby. It should be understood, however, that the procedures described and the results shown are for purposes of illustration only and applicants desire to be limited only by the hereinabove generic disclosure.

EXAMPLE 1 a. In a 500 ml glass vessel 200 g of silicon carbide having a grain size of 1 – 5 microns was stirred with 130 ml of distilled water, using an agitator. 2 g of N-beta-aminoethyl-gamma-aminopropyltrimethoxy silane was then added and agitation continued for 5 minutes. The resulting mixture was then evaporated in a flat dish to dryness in an oven maintained at a temperature of 105° C.

b. 30 g of the silicon carbide prepared as above described was then added to 200 ml of a solution prepared by mixing
240 g of nickel sulfate ($NiSO_4 \cdot 7 H_2O$)
45 g of nickel chloride ($NiCl_2 \cdot 6 H_2O$)
30 g of boric acid
1000 ml of distilled water
by means of an agitating apparatus operated at 2,400 revolutions per minute. The resulting suspension thus obtained was then filtered through a coarse filter to free it from agglomerates.

From the galvanic bath produced as above described, by means of a nickel anode having a surface of 25 cm², a bath temperature of 55° – 60°C, with light agitation of the bath and a current density of 8 A/dm² for 60 minutes there was deposited a coating on a copper cathode having a surface of 25 cm². The spacing between the anode and cathode amounted to 4 cm.

To determine the amount of silicon carbide (SiC) embedded in the nickel coating, the coated cathode was cut on an area of 16 cm² and dissolved in 100 ml of concentrated nitric acid with heating. The residue consisted of silicon carbide (SiC) which was then weighed.

For comparison, the operation under 1(b) was repeated using untreated silicon carbide.

EXAMPLE 2

The operation described in Example 1 was repeated except that the amino-organosilicone used was O-beta-aminoethyl-gamma-oxypropylmethyl-bis (beta-aminoethoxy-) silane.

EXAMPLE 3

In this example the procedure described in Example 1 was repeated with the modification that the amino-organosilicon used was the same amount of gamma-aminopropyltriethoxy silane.

The following Table shows the weights of silicon carbide (SiC) present in the coatings produced as above described.

TABLE

| | SiC/dm² mg | % by Weight Based on Comparison Test |
|---|---|---|
| Comparison Test | 125 | 100 |
| Example 1 | 293 | 134 |
| Example 2 | 316 | 154 |
| Example 3 | 334 | 167 |

What is claimed is:

1. Process for the production by electroplating of metallic coatings containing embedded therein nonmetallic, solid materials having a grain size not greater than 10 microns, which comprises incorporating in the electroplating baths containing said solid materials 0.1 – 3.0 percent, by weight, of at least one amino-organosilicon compound, based on the weight of said nonmetallic solid materials to be embedded in said metallic coatings.

2. Process according to claim 1, wherein the amino-organosilicon compound is selected from the group represented by the formula

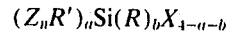

$(Z_nR')_a Si(R)_b X_{4-a-b}$ wherein $R$ represents a monovalent hydrocarbon residue, $R'$ represents an aliphatic residue having one or more than two carbon atoms, which can be interrupted through ether oxygen atom and which has a valence of $n + 1$, n represents a positive whole number, $X$ represents a substituent selected from the group consisting of a hydrolyzable group, a hydrolyzable atom and a hydroxyl, a stands for a numeral selected from 1 and 2, b stands for a numeral selected from the group consisting of 0, 1 and 2, and where the sum of $a + b$ is 1, 2 or 3, and Z represents the group $NH_2$ or a monovalent group which is bound through a carbon-nitrogen bond to $R'$.

3. Process according to claim 1, wherein the amino-organosilicon is gamma-aminopropyltriethoxy silane.

4. Process according to claim 1, wherein the amino-organosilicon compound is N-beta-aminoethyl-gamma-aminopropyl-trimethoxy silane.

5. Process according to claim 1, wherein the amino-organosilicon compound is O-beta-aminoethyl-gamma-oxypropylmethyl-bis-(beta-aminoethoxy-) silane.

6. Process according to claim 1, wherein the amino-organosilicon compound is adsorbed to the nonmetallic, solid material to be embedded in the metallic coating before introduction into the electrolyte bath.

* * * * *